US012238295B2

(12) United States Patent
Saeedi et al.

(10) Patent No.: US 12,238,295 B2
(45) Date of Patent: *Feb. 25, 2025

(54) SPATIAL BLOCK-LEVEL PIXEL ACTIVITY EXTRACTION OPTIMIZATION LEVERAGING MOTION VECTORS

(71) Applicant: ATI Technologies ULC, Markham (CA)

(72) Inventors: Mehdi Saeedi, Markham (CA); Boris Ivanovic, Markham (CA)

(73) Assignee: ATI Technologies ULC, Markham (CA)

( * ) Notice: Subject to any disclaimer, the term of this patent is extended or adjusted under 35 U.S.C. 154(b) by 342 days.

This patent is subject to a terminal disclaimer.

(21) Appl. No.: 17/236,910

(22) Filed: Apr. 21, 2021

(65) Prior Publication Data

US 2021/0243450 A1 Aug. 5, 2021

Related U.S. Application Data

(63) Continuation of application No. 16/147,172, filed on Sep. 28, 2018, now Pat. No. 10,992,938.

(51) Int. Cl.
*H04N 19/14* (2014.01)
*H04N 19/176* (2014.01)
*H04N 19/513* (2014.01)

(52) U.S. Cl.
CPC ........... *H04N 19/14* (2014.11); *H04N 19/176* (2014.11); *H04N 19/521* (2014.11)

(58) Field of Classification Search
CPC .. H04N 19/521; H04N 19/176; H04N 19/182; H04N 19/14
See application file for complete search history.

(56) References Cited

U.S. PATENT DOCUMENTS

| 6,483,876 | B1 * | 11/2002 | Chang | ................. | H04N 19/137 |
| | | | | | 375/E7.114 |
| 8,184,200 | B1 * | 5/2012 | Biswas | ................. | H04N 7/014 |
| | | | | | 348/452 |

(Continued)

FOREIGN PATENT DOCUMENTS

WO 2015012253 A1 1/2015

OTHER PUBLICATIONS

Extended European Search Report in European Patent Application No. 19866445.0, mailed Jun. 9, 2022, 8 pages.

(Continued)

*Primary Examiner* — Rowina J Cattungal
(74) *Attorney, Agent, or Firm* — Kowert, Hood, Munyon, Rankin & Goetzel, P.C.; Rory D. Rankin

(57) ABSTRACT

Systems, apparatuses, and methods for implementing spatial block-level pixel activity extraction optimization leveraging motion vectors are disclosed. Control logic coupled to an encoder generates block-level pixel activity metrics for a new frame based on the previously calculated block-level pixel activity data from a reference frame. A cost is calculated for each block of a new frame with respect to a corresponding block of the reference frame. If the cost is less than a first threshold, then the control logic generates an estimate of a pixel activity metric for the block which is equal to a previously calculated pixel activity metric for a corresponding block of the reference frame. If the cost is greater than the first threshold but less than a second threshold, an estimate of the pixel activity metric is generated by extrapolating from the previously calculated pixel activity metric.

20 Claims, 9 Drawing Sheets

(56) References Cited

U.S. PATENT DOCUMENTS

| | | | |
|---|---|---|---|
| 10,097,851 B2 | 10/2018 | Lee et al. | |
| 10,992,938 B2 | 4/2021 | Saeedi et al. | |
| 2005/0047504 A1 | 3/2005 | Sung et al. | |
| 2005/0141622 A1* | 6/2005 | Seo | H04N 19/895 |
| | | | 375/E7.176 |
| 2006/0222078 A1 | 10/2006 | Raveendran | |
| 2007/0064800 A1* | 3/2007 | Ha | H04N 19/31 |
| | | | 375/E7.125 |
| 2013/0202036 A1* | 8/2013 | Nagori | H04N 19/176 |
| | | | 375/240.13 |
| 2013/0279563 A1 | 10/2013 | Li et al. | |
| 2014/0241436 A1* | 8/2014 | Laroche | H04N 19/139 |
| | | | 375/240.16 |
| 2014/0269919 A1 | 9/2014 | Rodriguez | |
| 2014/0376624 A1 | 12/2014 | Li et al. | |
| 2015/0055706 A1 | 2/2015 | Xu et al. | |
| 2015/0256850 A1 | 9/2015 | Kottke et al. | |
| 2016/0050423 A1* | 2/2016 | Alshina | H04N 19/154 |
| | | | 375/240.12 |
| 2016/0073111 A1 | 3/2016 | Lee et al. | |
| 2017/0339390 A1 | 11/2017 | Doshi | |
| 2018/0109804 A1 | 4/2018 | Saeedi | |
| 2018/0316915 A1* | 11/2018 | Igarashi | H04N 19/157 |
| 2019/0045210 A1 | 2/2019 | Guermazi et al. | |
| 2019/0208223 A1* | 7/2019 | Galpin | H04N 19/52 |

OTHER PUBLICATIONS

Shabat et al., "A comparative Study of Local Directional Pattern for Texture Classification", 2014 World Symposium on Computer Applications & Research, Jan. 18, 2014, 7 pages.

First Examination Report in Indian Patent Application No. 202117010679, mailed Feb. 1, 2022, 6 pages.

"Co-occurrence matrix", Wikipedia.org, Sep. 7, 2016, 2 pages, https://en.wikipedia.org/wiki/Co-occurrence_matrix. [Retrieved Jul. 31, 2018].

International Search Report and Written Opinion in International Application No. PCT/IB2019/057945, mailed Dec. 9, 2019, 8 pages.

* cited by examiner

Picture 't-2': High Metric Granularity, Lower Error

Picture 't-2': Low Metric Granularity, Higher Error

SPATIAL BLOCK-LEVEL PIXEL ACTIVITY EXTRACTION OPTIMIZATION LEVERAGING MOTION VECTORS

CROSS REFERENCE TO RELATED APPLICATIONS

This application is a continuation of U.S. patent application Ser. No. 16/147,172, entitled "SPATIAL BLOCK-LEVEL PIXEL ACTIVITY EXTRACTION OPTIMIZATION LEVERAGING MOTION VECTORS", filed Sep. 28, 2018, the entirety of which is incorporated herein by reference.

BACKGROUND

Description of the Related Art

Various applications perform encoding and decoding of images or video content. For example, video transcoding, desktop sharing, cloud gaming and gaming spectatorship are some of the applications which include support for encoding and decoding of content. Pixel activity calculations inside a block are commonly performed in different video processing and analysis algorithms. For example, block-level pixel activity can be used to determine texture types in an image for some applications. Examples of blocks include a coding tree block (CTB) for use with the high efficiency video coding (HEVC) standard or a macroblock for use with the H.264 standard. Other types of blocks for use with other types of standards are also possible.

Different methods can be used to calculate pixel activities for the blocks of an image or video frame. For example, in one implementation, a gray-level co-occurrence matrix (GLCM) is calculated for each block of the frame. GLCM data shows how often different variations of pixel brightness occur in a block. GLCM data can be calculated for pixels with distance d and angle theta. In another implementation, a two-dimensional (2D) spatial mean gradient is calculated for a given block. This gradient can capture vertical and horizontal edges. In a further implementation, a wavelet transform, or other types of transforms, is used to measure an activity parameter for a given block. Accordingly, as used herein, the terms "pixel activity metric", "pixel activity", or "pixel activities" are defined as a GLCM, a gradient, a wavelet transform, or other metric or summary statistic for the block. It is noted that the terms "pixel activity" and "block-level pixel activity" can be used interchangeably herein. In some cases, the pixel activity is represented using a matrix. In other cases, the pixel activity is represented using one or more values.

Calculating block-level pixel activity for each block of every frame of a video can be a time-consuming and/or an unnecessary power consuming operation depending on the type of activity metric that is going to be used. For example, calculating pixel co-occurrence from scratch requires evaluating pixel pairs for all pixels inside a block. This type of calculation requires processing the entire frame. While it is possible to perform parallel calculations in some cases, the processing demand is still high.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
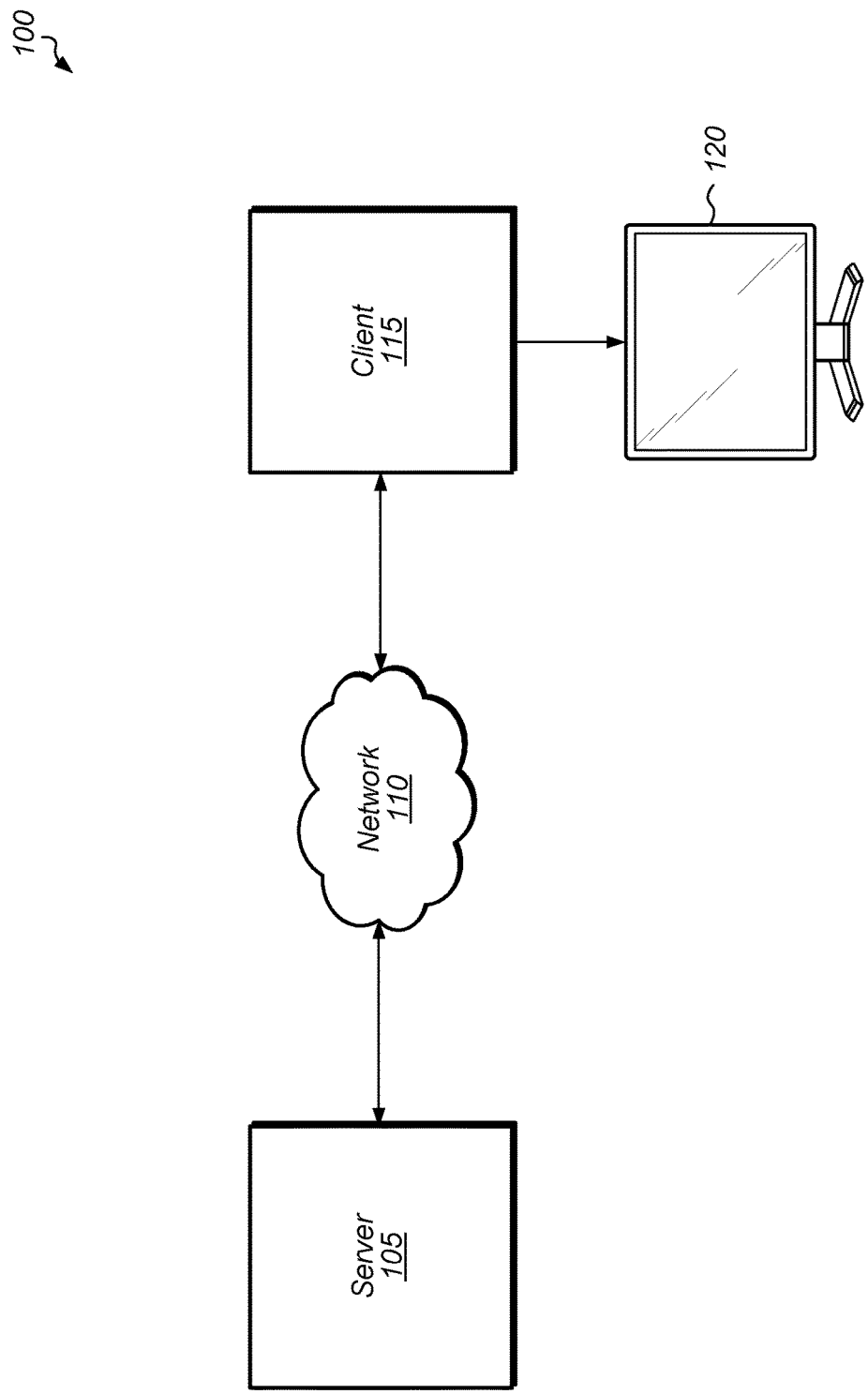
FIG. 1 is a block diagram of one implementation of a system for encoding and decoding content.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing spatial block-level pixel activity extraction optimization techniques are disclosed herein. In one implementation, a system includes an encoder and control logic coupled to the encoder. In one implementation, the control logic leverages the motion estimation data to avoid unnecessary and expensive calculation of pixel activities. In this implementation, the control logic calculates an approximate value for the pixel activities. For example, in one implementation, the control logic uses the local motion vectors and block-level pixel activities calculated for a reference frame to generate estimates of the pixel activities for blocks of a new frame. As used herein, the term "reference frame" is defined as a frame of a video stream that is used to define and/or encode one or more future frames of the video stream. In one implementation, the control logic processes a new frame on a block-by-block basis. In one implementation, the pixel activities are a gradient calculated for the block of the new frame. In another implementation, the pixel activities include a texture analysis of the block of the new frame. In other implementations, the pixel activities include any of various summary statistics or other mathematical quantities (e.g., average, maximum value, variance).

In one implementation, the control logic calculates the difference (i.e., sum of differences cost) between a block of a new frame and a corresponding block of a reference frame, wherein the corresponding block of the reference frame is identified by a motion vector. If the difference (or "error") is below a first threshold, then the control logic copies the pixel activities from the corresponding block of the reference frame rather than recalculating the pixel activities of the block of the new frame. If the error is greater than or equal to the first threshold but less than a second threshold, then the control logic extrapolates from the pixel activities from the corresponding block of the reference frame using the motion estimation data to generate estimates of the pixel activities of the block of the new frame. Otherwise, if the error is greater than or equal to the second threshold, then the control logic calculates the pixel activities for the block of the new frame using the conventional approach.

Referring now to FIG. 1, a block diagram of one implementation of a system 100 for encoding and decoding content is shown. System 100 includes server 105, network 110, client 115, and display 120. In other implementations, system 100 includes multiple clients connected to server 105 via network 110, with the multiple clients receiving the same bitstream or different bitstreams generated by server 105. System 100 can also include more than one server 105 for generating multiple bitstreams for multiple clients.

In one implementation, system 100 implements encoding and decoding of video content. In various implementations, different applications such as a video game application, a cloud gaming application, a virtual desktop infrastructure application, or a screen sharing application are implemented by system 100. In other implementations, system 100 executes other types of applications. In one implementation, server 105 renders video or image frames, generates pixel activity metrics for blocks of the frames, encodes the frames into a bitstream, and then conveys the encoded bitstream to client 115 via network 110. Client 115 decodes the encoded bitstream and generate video or image frames to drive to display 120 or to a display compositor.

In one implementation, server 105 generates estimates of pixel activity metrics for blocks of the frames rather than calculating pixel activity metrics from scratch. For example, a block (i,j) in a frame f is denoted by block (f,i,j). In one implementation, the pixel activity metric is available for block (f1,i,j) in the reference frame (f1). In one implementation, the motion vectors are calculated for all blocks inside the current frame f. One method of calculating motion estimation data is to determine the sum of absolute differences (SAD) between pixel samples of a reference block in the reference image, and another candidate block in the current image. Candidates for the current block are multiple locations in a "search area"—each of which has a horizontal and vertical displacements of dx and dy. Motion estimation finds the vector (dx,dy) that has the smallest SAD in the search area. In this case the SAD is referred to as a "cost". Other cost functions are possible. The reference image can be different from the current image (temporal) or the reference image can be the same image (spatial). The motion vector MV(dx, dy, i, j, C) represents the motion vector with dx and dy displacement for block i and j and with cost C. The pixel activity metric of Block(i, j, f) is calculated based on the pixel activity metric of block (i−dx, j−dy, f1) where f1 is the reference frame with motion vector (dx, dy, i, j, C).

In one implementation, if C<Threshold1, then the two blocks are similar, and the pixel activity metric of the new block is estimated as the pixel activity metric of the related block in the reference frame. If C≥Threshold1 and C<Threshold2, then the two blocks are similar with some differences. In this case, depending on the requirements, a transfer function is used to map the cost C to a correction factor. The correction factor is used to update the pixel activity metric of the reference block to generate an estimate of pixel activity metric for the current block. Alternatively, a machine-learning solution is used to gather some information including the motion estimation cost and the reference-block pixel activity metric to calculate the pixel activity metric of the new block. If C>Threshold2, then the two blocks are different, and the pixel activity metric for that block is calculated from scratch.

Network 110 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 110 includes remote direct memory access (RDMA) hardware and/or software, transmission control protocol/internet protocol (TCP/IP) hardware and/or software, router, repeaters, switches, grids, and/or other components.

Server 105 includes any combination of software and/or hardware for rendering video/image frames and encoding the frames into a bitstream. In one implementation, server 105 includes one or more software applications executing on one or more processors of one or more servers. Server 105 also includes network communication capabilities, one or more input/output devices, and/or other components. The processor(s) of server 105 include any number and type (e.g., graphics processing units (GPUs), central processing units (CPUs), digital signal processors (DSPs), field programmable gate arrays (FPGAs), application specific integrated circuits (ASICs)) of processors. The processor(s) are coupled to one or more memory devices storing program instructions executable by the processor(s). Similarly, client 115 includes any combination of software and/or hardware for decoding a bitstream and driving frames to display 120. In one implementation, client 115 includes one or more software applications executing on one or more processors of one or more computing devices. In various implementations, client 115 is a computing device, game console, mobile device, streaming media player, or other type of device.

Figure 2:
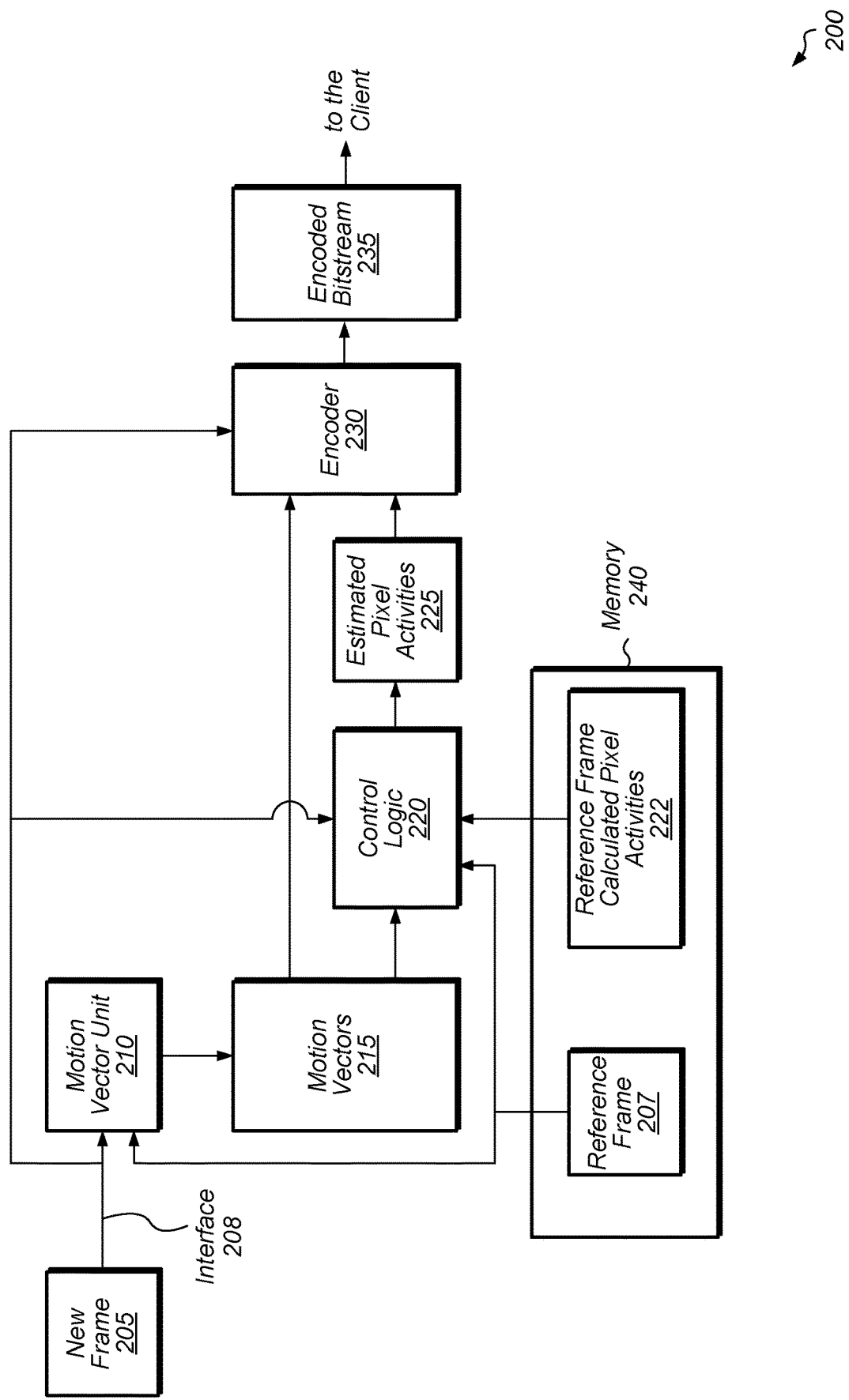
FIG. 2 is a block diagram of one implementation of a server.

Turning now to FIG. 2, a block diagram of one implementation of the software components of a server 200 for encoding frames of a video is shown. It is noted that in other implementations, server 200 includes other components and/or is arranged in other suitable manners than is shown in FIG. 2. A new frame 205 of a video is received by server 200 on interface 208 and coupled to motion vector unit 210, control logic 220, and encoder 230. Depending on the implementation, interface 208 is a bus interface, a memory interface, or an interconnect to a communication fabric and/or other type(s) of device(s). Each of motion vector unit 210, control logic 220, and encoder 230 is implemented using any suitable combination of hardware and/or software. Motion vector unit 210 generates motion vectors 215 for the blocks of new frame 205 based on a comparison of new frame 205 to reference frame 207. In one implementation, reference frame 207 is stored in memory 240. Memory 240 is representative of any number and type of memory or cache device(s) for storing data and/or instructions associated with the encoding process.

Motion vectors 215 are provided to control logic 220 and encoder 230. Control logic 220 generates estimated pixel activities 225 from reference frame calculated pixel activities 222 based on motion vectors 215. For example, in one implementation, control logic 220 processes new frame 205 on a block-by-block basis. For each block, control logic 220 retrieves the calculated sum of differences cost between the block and a corresponding block in reference frame 207 identified by a corresponding motion vector 215. If the sum of differences cost for the block is less than a first threshold, then control logic 220 generates an estimated pixel activity 225 for the block as the previously calculated pixel activity 222 for the corresponding block of reference frame 207.

If the sum of differences cost for the block is greater than or equal to the first threshold but less than a second threshold, then control logic 220 generates the estimated pixel activity 225 for the block by extrapolating from the pixel activity 222 of a corresponding block in the reference frame 207 based on the motion vector 215 of the block. For example, in one implementation, control logic 220 uses a transfer function to map the sum of differences cost to a correction factor which is used to update the pixel activity 222 of the corresponding block from reference frame 207. This updated pixel activity from the corresponding block from reference frame 207 is then used as the estimated pixel activity 225 for the block of new frame 205. In one implementation, the transfer function is applied using a lookup table. If the sum of differences cost for the block is greater than or equal to the second threshold, then control logic 220 generates the pixel activity for the block from scratch using conventional techniques.

Figure 3:
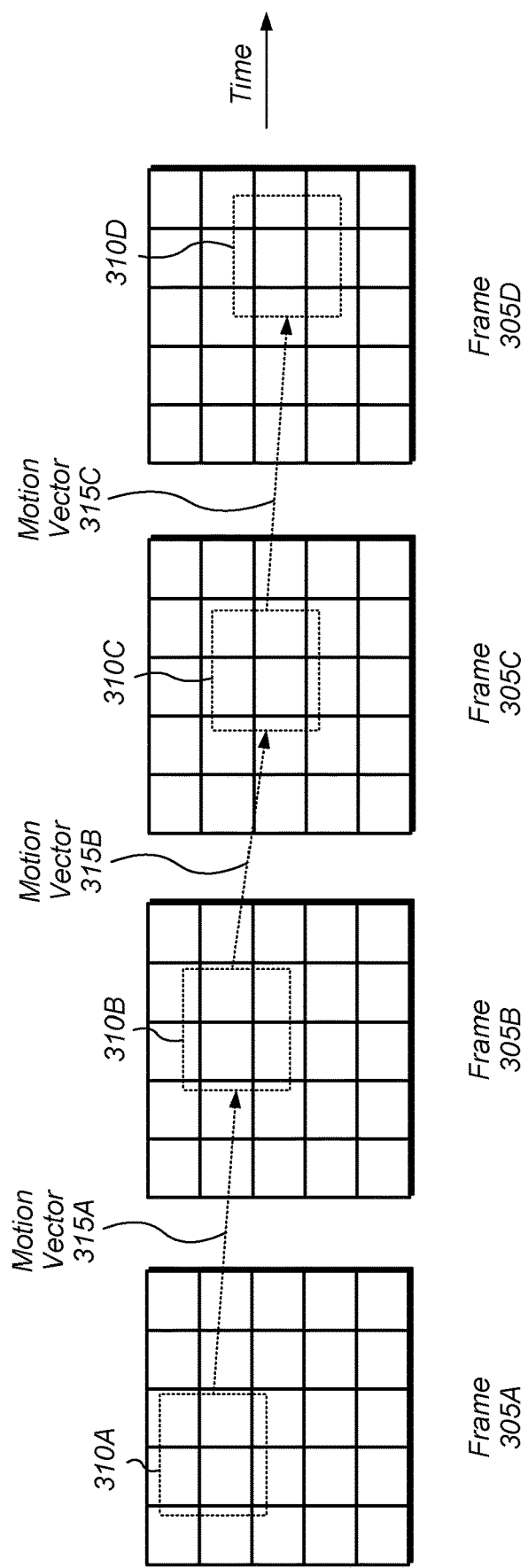
FIG. 3 is a block diagram of one implementation of a set of motion vectors for a sequence of video frames.

Referring now to FIG. 3, a block diagram of one implementation of a set of motion vectors 315A-C for a sequence of video frames 305A-D is shown. Frames 305A-D represent consecutive frames of a video sequence. Box 310A represents an individual block of pixels within frame 305A. Box 310A can also be referred to as a macroblock. The arrow 315A represents the known motion of the imagery within box 310A as the video sequence moves from frame 305A to 305B. The known motion illustrated by arrow 315A can be defined by a motion vector. It is noted that although motion vectors 315A-C point in the direction of motion of box 310 in subsequent frames, in another implementation, a motion vector can be defined to point in a direction opposite to the motion of the imagery. For example, in some compression standards, a motion vector associated with a macroblock points to the source of that block in the reference frame. The reference frame can be forward or backward in time. It is also noted that motion vectors can represent entropy in some implementations.

In one implementation, boxes 310B-D can be tracked in subsequent frames using motion vectors 315A-C. For example, the motion vector 315A indicates the change in position of box 310B in frame 305B as compared to box 310A in frame 305A. Similarly, motion vector 315B indicates the change in location of box 310C in frame 310C as compared to box 310B in frame 305B. Also, motion vector 315C indicates the change in location of box 310D in frame 310D as compared to box 310C in frame 305C. In another implementation, a motion vector is defined to track the reverse motion of a block from a given frame back to the previous frame.

In one implementation, when an encoder needs to generate various pixel activity metrics for the blocks of a new frame, the encoder generates estimates of the pixel activity metrics based on the previously calculated pixel activity metrics of the corresponding blocks in a previous frame. In one implementation, the encoder uses the motion vectors 315A-C to identify which corresponding block in the previous frame matches a given block in a new frame. The encoder then uses the previously calculated pixel activity metric for the identified block in the previous frame to help in generating the estimate of the pixel activity metric of the block in the new frame. In one implementation, the encoder uses the previously calculated pixel activity metric, without modifications, as the estimate of the pixel activity metric of the block in the new frame. In another implementation, the encoder extrapolates from the previously calculated pixel activity metric by using a transfer function to map the sum of differences cost or any other cost between the blocks to a correction factor. The correction factor is then applied to the previously calculated pixel activity to generate the estimate of the pixel activity metric for the block in the new frame.

Figure 4:
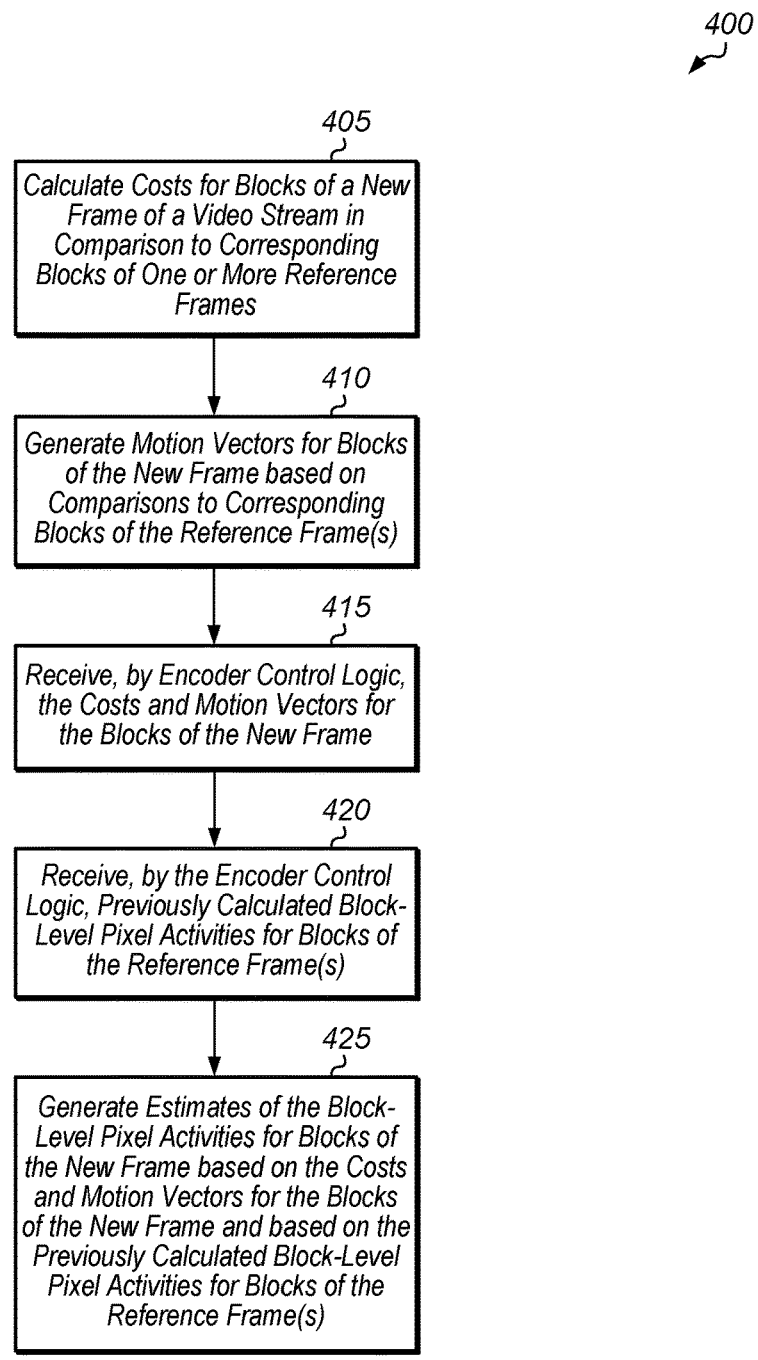
FIG. 4 is a generalized flow diagram illustrating one implementation of a method for implementing spatial block-level pixel activity extraction optimization leveraging motion vectors.
Figure 5:
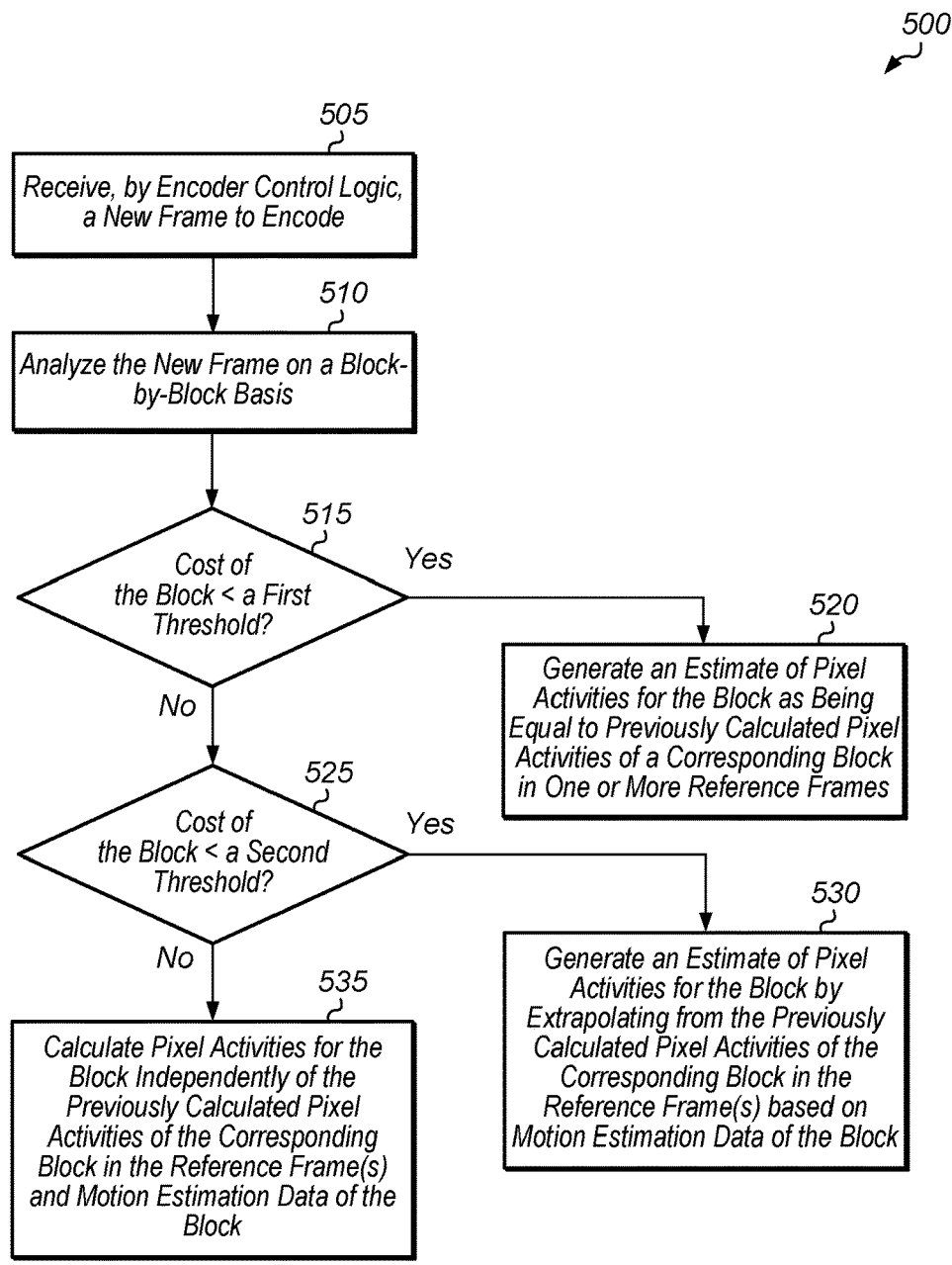
FIG. 5 is a generalized flow diagram illustrating another implementation of a method for generating block-level pixel activities for blocks of a new frame.
Figure 6:
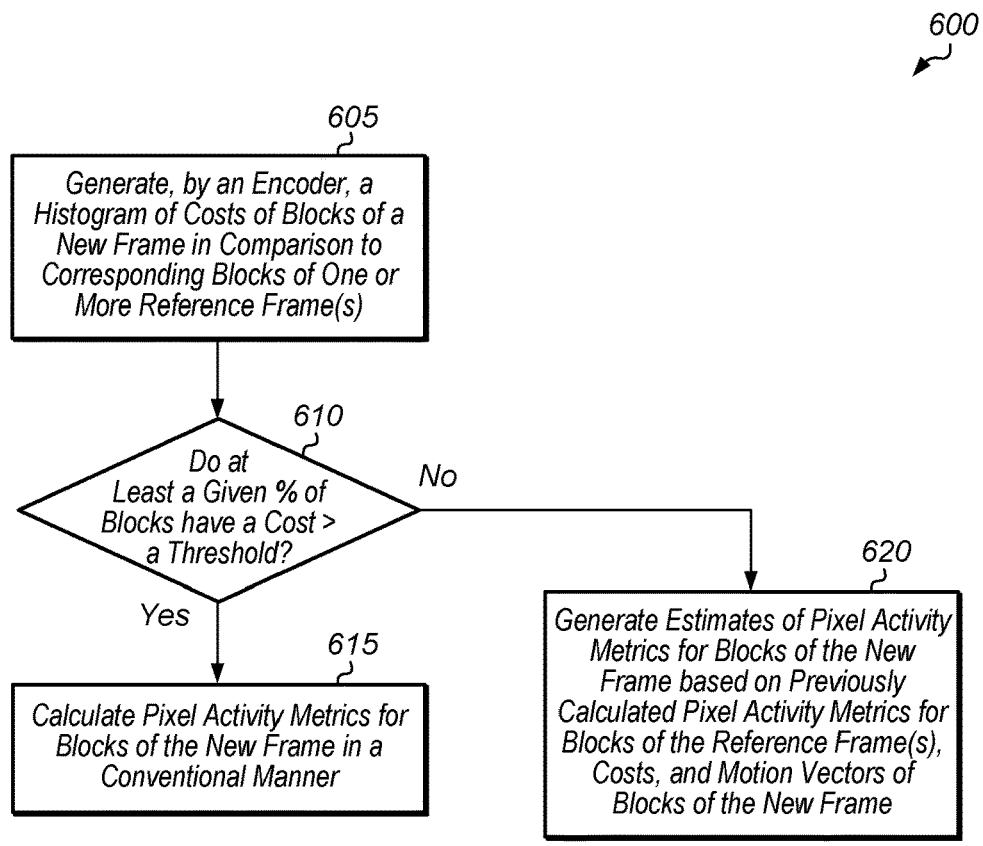
FIG. 6 is a generalized flow diagram illustrating one implementation of a method for determining a pixel activity metric generation scheme.

Turning now to FIG. 4, one implementation of a method 400 for implementing spatial block-level pixel activity extraction optimization leveraging motion vectors is shown. For purposes of discussion, the steps in this implementation and those of FIG. 5-6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A motion vector unit calculates a sum of absolute differences cost for blocks of a new frame of a video stream in comparison to corresponding blocks of one or more reference frames (block 405). In one implementation, the cost is a sum of absolute differences cost. In other implementations, the cost is other types of costs or errors calculated from the blocks of the new frame and corresponding blocks of one or more reference frames. In one implementation, the motion vector unit is part of an encoder, with the encoder also including control logic. In one implementation, the encoder is implemented on a system with at least one processor coupled to at least one memory device. In one implementation, the encoder is implemented on a server which is part of a cloud computing environment. The motion vector unit generates motion vectors for blocks of the new frame based on comparisons to corresponding blocks of the reference frame(s) (block 410). Encoder control logic receives the costs and motion vectors for the blocks of the new frame (block 415).

The control logic also receives the previously calculated block-level pixel activities for blocks of the reference frame(s) (block 420). Then, the control logic generates estimates of the block-level pixel activities for blocks of the new frame based on the costs and motion vectors for the blocks of the new frame and based on the previously calculated block-level pixel activities for blocks of the reference frame(s) (block 425). After block 425, method 400 ends. One example of an implementation for performing block 425 is described in further detail below in the discussion of FIG. 5. In various implementations, the block-level pixel activities for blocks of the new frame to help with the encoding of the new frame, for classifying the new frame, and/or for performing further analysis of the new frame. In one implementation, the block-level pixel activities for blocks of the new frame are used to classify the new frame into one of a plurality of categories, to identify what types of objects are present in the new frame, and/or to perform other actions.

Turning now to FIG. 5, one implementation of a method 500 for generating block-level pixel activities for blocks of a new frame is shown. Encoder control logic receives a new frame to encode (block 505). The encoder control logic is implemented using any suitable combination of hardware and/or software. The control logic analyzes the new frame on a block-by-block basis (block 510). It is assumed for the purposes of this discussion that motion estimation data (e.g., motion vectors) and costs have already been calculated for the blocks of the new frame when the control logic receives the new frame to encode. In implementations where the motion estimation data or costs have not been calculated, the control logic calculates these values in response to receiving the new frame to encode. Any type of costs can be calculated depending on the implementation.

For each block of the new frame, if the cost of the block is less than a first threshold (conditional block 515, "yes" leg), then the control logic generates an estimate of pixel activities for the block as being equal to previously calculated pixel activities of a corresponding block in one or more reference frames (block 520). If the cost of the block is greater than or equal to the first threshold (conditional block 515, "no" leg), then the control logic determines if the cost of the block is less than a second threshold (conditional block 525). If the cost of the block is less than the second threshold (conditional block 525, "yes" leg), then the control logic generates an estimate of pixel activities for the block by extrapolating from the previously calculated pixel activities of the corresponding block in the reference frame(s) based on motion estimation data of the block (block 530). If the cost of the block is greater than or equal to the second threshold (conditional block 525, "no" leg), then the control logic calculates pixel activities for the block independently of the previously calculated pixel activities of the corresponding block in the reference frame(s) and motion estimation data of the block (block 535). In other words, the control logic calculates pixel activities for the block from scratch, in the conventional manner in block 535. After blocks 520, 530, and 535, method 500 end.

Turning now to FIG. 6, one implementation of a method 600 for determining a pixel activity metric generation scheme is shown. An encoder generates a histogram of costs of blocks of a new frame in comparison to corresponding blocks of one or more reference frames (block 605). If at least a given percentage of blocks have a cost greater than a threshold (conditional block 610, "yes" leg), then the encoder calculates pixel activity metrics for blocks of the new frame in a conventional manner (block 615). The values of the given percentage and the threshold can vary according to the implementation. If less than the given percentage of blocks have a cost greater than the threshold (conditional block 610, "no" leg), then the encoder generates estimates of pixel activity metrics for blocks of the new frame based on previously calculated pixel activity metrics for blocks of the reference frame(s), costs, and motion vectors of blocks of the new frame (block 620). One example of performing block 620 is described in the discussion associated with FIG. 5. After blocks 615 and 620, method 600 ends.

Figure 7:
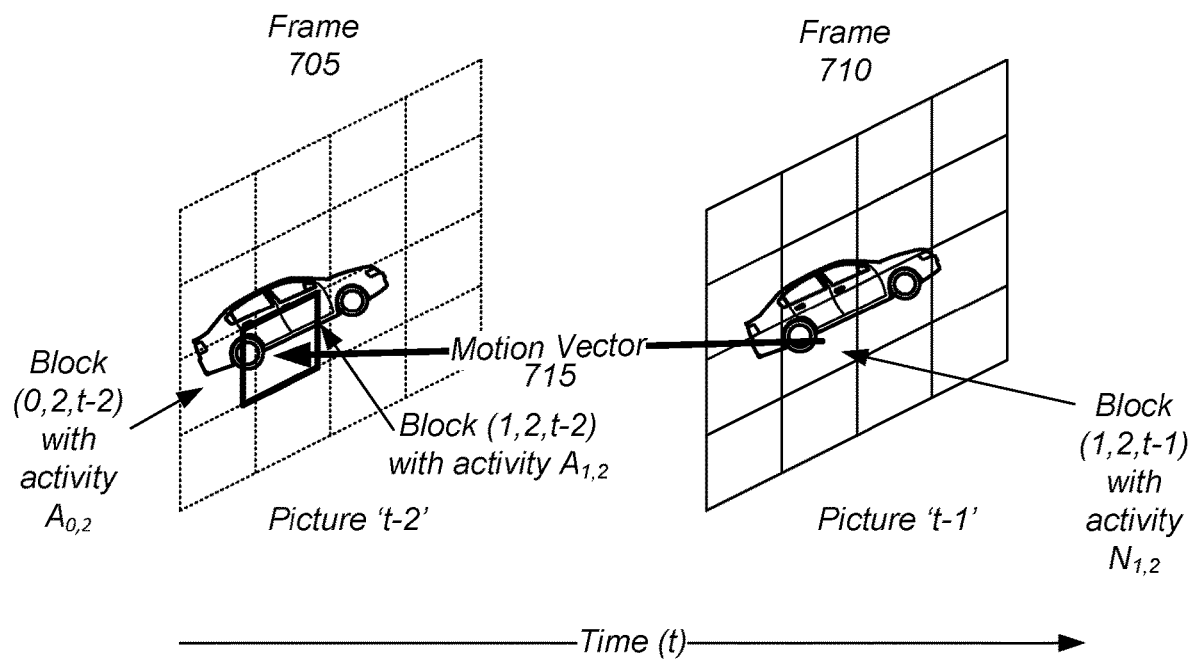
FIG. 7 is a block diagram of one implementation of consecutive frames of a video sequence and a corresponding motion vector.

Referring now to FIG. 7, a block diagram of one implementation of consecutive frames of a video stream and a corresponding motion vector is shown. In some implementations, a pixel activity metric may not be available for an arbitrary reference block. For example, activities may be available only at macroblock granularity, which could mean that only referenced blocks at locations (16*i, 16*j) are available, where i and j are integers. It is noted that the example of a block size of 16 pixels by 16 pixels is only indicative of one implementation. In other implementations, macroblocks or coding units can have other sizes. For other motion vectors, an estimate of the value of the pixel activity metric can be estimated based on the blocks from which the pixels were sourced if the error is acceptable. Pixels could be sourced from one block in a specific case, while in other cases, pixels could be sourced from up to four blocks. In the example shown in FIG. 7, pixels are sourced from two blocks.

Two successive video frames 705 and 710 at times 't-2' and 't-1', respectively are shown in FIG. 7. Within video frame 705 at time 't-2', block (0, 2, t-2) has pixel activity metric $A_{0,2}$ and block (1, 2, t-2) has pixel activity metric $A_{1,2}$. Within video frame 710 at time 't-1', block (1, 2, t-1) has pixel activity metric $N_{1,2}$. In one implementation, if the cost of block (1, 2, t-1) compared to the matching pixels of frame 705 is less than a first threshold, then motion vector 715 match is considered to be a close match and therefore the following estimation method can be used. It is assumed for the purposes of this discussion that block (0, 2, t-2) contributes $w_0$ percentage of its pixels to block (1, 2, t-1) and that block (1, 2, t-2) contributes $w_1$ percentage of its pixels to block (1, 2, t-1). The possible error is inversely proportional to the maximum of $w_0$ and $w_1$. Based on this possible error, the blocks which require calculation of activity rather than just generating an estimate can be determined. In one implementation, an estimate could be the higher of $A_{0,2}$ or $A_{1,2}$ or an interpolation such as $N_{1,2}=w_0*A_{0,2}+w_1*A_{1,2}$, where $w_0+w_1=1$.

In some cases, a candidate estimated area can be calculated occasionally regardless of the possible error. For example, a candidate estimated area can be calculated when a randomly generated value x is greater than a random threshold. This is to ensure that the estimated pixel activity metric does not drift too far from the actual signal. In one scenario, if the random threshold value is set to 0.9, this would mean that 90% of the time the actual calculation of the pixel activity metric is skipped. The value of the random threshold can be reduced if more precision is needed.

Figure 8:
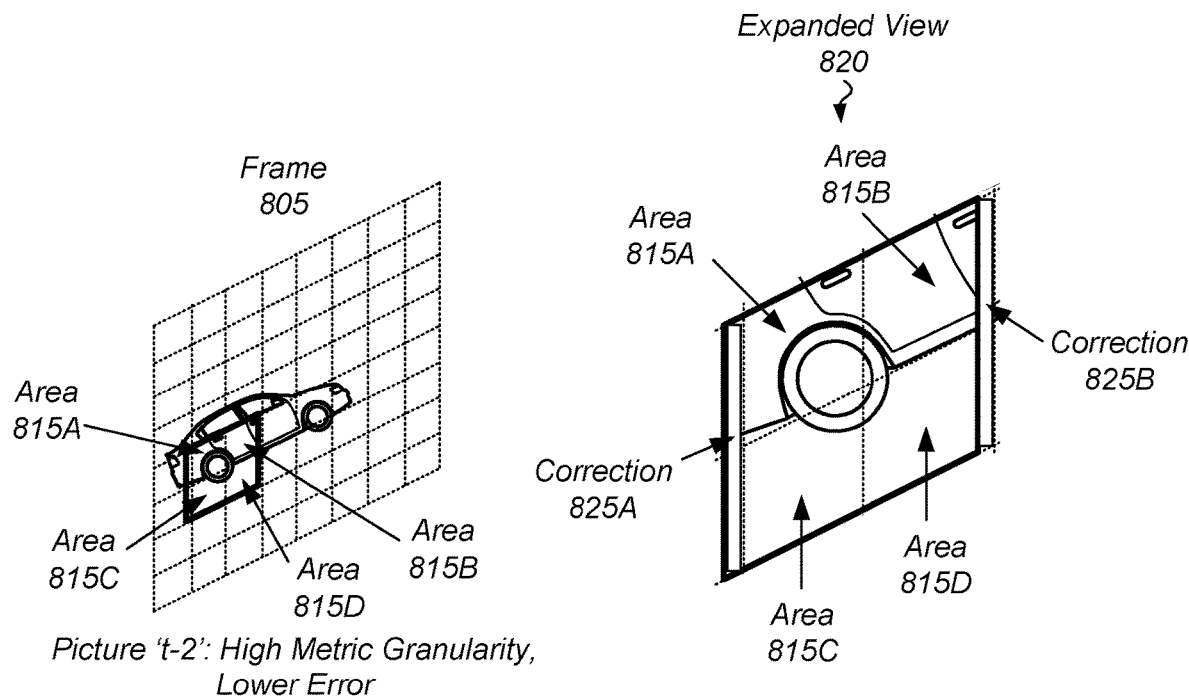
FIG. 8 is a block diagram of one implementation of frames with different block metric granularity levels.
Figure 8:
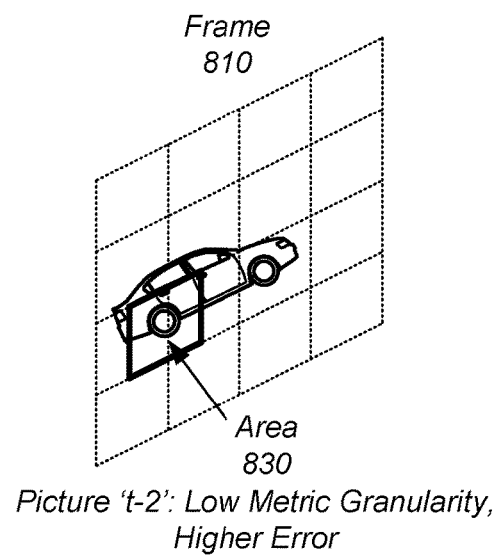

Turning now to FIG. 8, a block diagram of one implementation of frames with different block metric granularity levels is shown. Many pixel activity metrics, such as discrete gradients, are cumulative over an area. In one implementation, these pixel activity metrics are structured for fast estimation by storing the metric at a finer granularity, by storing summed area tables, or using other acceleration data structures allowing fast calculation of metrics that have specific mathematical properties (e.g., homogeneous, additive). Estimates are calculated quickly by aggregating appropriate values from these data structures. For example, the pixel activity metric for area 830 of low metric granularity frame 810 is estimated by adding together the pixel activity metrics for areas 815A-D of high metric granularity frame 805. This estimate is deemed acceptable as the extra area that is included by areas 815B and 815D is considered insignificant (i.e., error is calculated to be acceptable). Similarly, the area missed immediately next to areas 815A and 815C is also considered insignificant. If additional precision is needed, corrections are made by calculating and adjusting for the metric's contribution in extra needed and unneeded areas.

If the estimate for high metric granularity frame 805 is not deemed sufficiently precise, then the estimate can be corrected. For example, in one implementation, correction 825A, shown in expanded view 820, is calculated for the contribution of the metric in the correspondingly marked area. Another correction 825B is calculated for the contribution of the metric in the correspondingly marked area. Then, the pixel activity metric for the reference block is estimated by adding together the metrics for areas 815A-D plus correction 825A and minus correction 825B. In this example, the corrections that are needed are due to errors caused by a horizontal offset. With different alignments, corrections may be needed to handle vertical offset errors; or for other alignments, corrections may be needed to adjust for both vertical and horizontal offsets.

Figure 9:
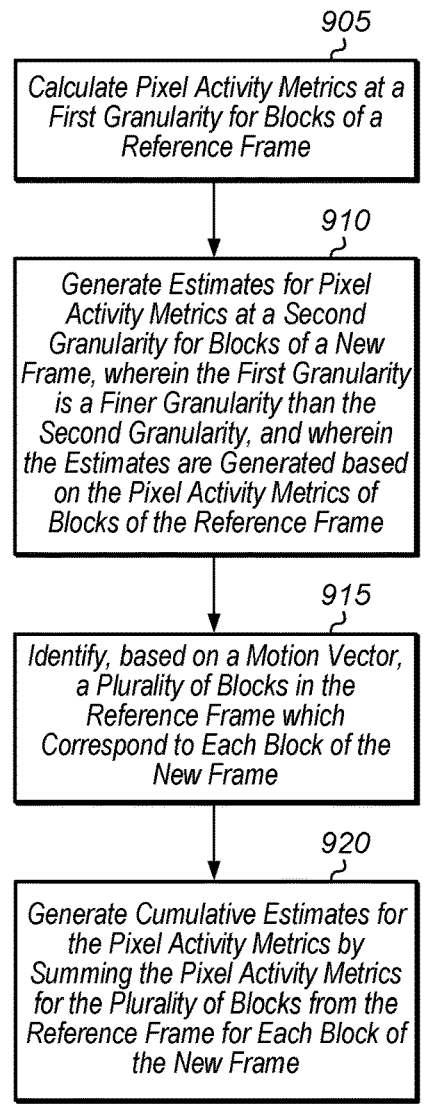
FIG. 9 is a generalized flow diagram illustrating one implementation of a method for calculating a pixel activity metric at different granularities.

Referring now to FIG. 9, one implementation of a method 900 for calculating a pixel activity metric at different granularities is shown. An encoder calculates pixel activity metrics at a first granularity for blocks of a reference frame (block 905). The encoder generates estimates for pixel activity metrics at a second granularity for blocks of a new frame, wherein the first granularity is a finer granularity than the second granularity, and wherein the estimates are generated based on the pixel activity metrics of blocks of the reference frame (block 910). As part of generating estimates for pixel activity metrics for blocks of the new frame at the second granularity, the encoder identifies, based on a motion vector, a plurality of blocks in the reference frame which correspond to each block of the new frame (block 915). Then, the encoder generates a cumulative estimate for the pixel activity metrics by summing the pixel activity metrics for the plurality of blocks from the reference frame for each block of the new frame (block 920). After block 920, method 900 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   circuitry configured to:
   receive a new video frame of a video stream;
   responsive to a difference between pixel samples of a block of the new video frame and a corresponding block of a reference video frame being less than a first threshold, set an estimate of pixel activities for the block of the new video frame equal to previously calculated pixel activities of the corresponding block of the reference video frame; and
   responsive to the difference being greater than a second threshold, calculate the pixel activities for the block of the new video frame.

2. The apparatus as recited in claim 1, wherein responsive to the difference being less than the first threshold, the circuitry is configured to set the estimate of pixel activities for the block of the new video frame at least in part based on motion estimation data for the new video frame.

3. The apparatus as recited in claim 2, wherein the circuitry is configured to calculate the pixel activities for the block of the new video frame independent of the previously calculated pixel activities, responsive to the difference exceeding the second threshold.

4. The apparatus as recited in claim 1, wherein responsive to the difference being greater than the first threshold and less than the second threshold, wherein the first threshold is less than the second threshold, the circuitry is further configured to:
   generate the estimate of pixel activities for the block of the new video frame by extrapolating from the previously calculated pixel activities for the block of the reference video frame.

5. The apparatus as recited in claim 4, wherein to extrapolate from the pixel activities for the block of the reference video frame, the circuitry is further configured to:
   map the difference to a correction factor using a transfer function; and
   update the pixel activities for the block of the reference video frame based on the correction factor.

6. The apparatus as recited in claim 1, wherein the difference between pixel samples of the block of the new video frame and the block of the reference video frame comprises a sum of absolute differences between pixel samples.

7. The apparatus as recited in claim 1, wherein the apparatus further comprises an encoder coupled to a memory, wherein the circuitry is further configured to send the pixel activities for the block of the new video frame to the encoder for generating an encoded block based on the pixel activities.

8. The apparatus as recited in claim 1, wherein the circuitry is further configured to identify the block of the reference video frame using a motion vector that indicates a change in position of the block of the new video frame as compared to the block of the reference video frame.

9. A method comprising:
   receiving, by control logic comprising circuitry, a new video frame of a video stream;
   responsive to a difference between pixel samples of a block of the new video frame and a corresponding block of a reference video frame being less than a first threshold, setting, by the circuitry, an estimate of pixel activities for the block of the new video frame equal to previously calculated pixel activities of the corresponding block of the reference video frame; and
   responsive to the difference being greater than a second threshold, calculating, by the circuitry, the pixel activities for the block of the new video frame.

10. The method as recited in claim 9, wherein responsive to the difference being less than the first threshold, the method further comprising setting, by the circuitry, the estimate of pixel activities for the block of the new video frame at least in part based on motion estimation data for the new video frame.

11. The method as recited in claim 10, further comprising calculating, by the circuitry, the pixel activities for the block of the new video frame independent of the previously calculated pixel activities, responsive to the difference exceeding the second threshold.

12. The method as recited in claim 9, wherein in response to the difference being greater than first threshold and less than the second threshold, wherein the first threshold is less than the second threshold, the method further comprises:
generating, by the circuitry, estimate of pixel activities for the block of the new video frame by extrapolating from the previously calculated pixel activities for the block of the reference video frame.

13. The method as recited in claim 12, wherein to extrapolate from the pixel activities for the block of the reference video frame, the method further comprises:
mapping, by the circuitry, the difference to a correction factor using a transfer function; and
updating, by the circuitry, the pixel activities for the block of the reference video frame based on the correction factor.

14. The method as recited in claim 9, further comprising identifying, by the circuitry, the block of the reference video frame using a motion vector that indicates a change in position of the block of the new video frame as compared to the block of the reference video frame.

15. A system comprising:
a server configured to convey an encoded video bitstream via a network;
wherein the server comprises:
a memory configured to store a reference video frame of a video stream; and
circuitry coupled to the memory, wherein the circuitry is configured to:
receive a new video frame of the video stream;
responsive to a difference between pixel samples of a block of the new video frame and a corresponding block of a reference video frame being less than a first threshold, set an estimate of pixel activities for the block of the new video frame equal to previously calculated pixel activities of the corresponding block of the reference video frame; and
responsive to the difference being greater than a second threshold, calculate the pixel activities for the block of the new video frame.

16. The system as recited in claim 15, wherein responsive to the difference being less than the first threshold, the circuitry is configured to set the estimate of pixel activities for the block of the new video frame at least in part based on motion estimation data for the new video frame.

17. The system as recited in claim 15, wherein responsive to the difference being greater than the first threshold and less than the second threshold, wherein the first threshold is less than the second threshold, the circuitry is further configured to:
generate an estimate of pixel activities for the block of the new video frame by extrapolating from the previously calculated pixel activities for the block of the reference video frame.

18. The system as recited in claim 17, wherein to extrapolate from the pixel activities for the block of the reference video frame, the circuitry is further configured to:
map the difference to a correction factor using a transfer function; and
update the pixel activities for the block of the reference video frame based on the correction factor.

19. The system as recited in claim 15, wherein the circuitry is further configured to identify the block of the reference video frame using a motion vector that indicates a change in position of the block of the new video frame as compared to the block of the reference video frame.

20. The system as recited in claim 19, wherein the motion vector comprises horizontal and vertical displacements between the block of the new video frame as compared to the block of the reference video frame, wherein the difference is less than a difference between the block of the new video frame and any other block in the reference video frame.

* * * * *